(12) United States Patent
Schumann et al.

(10) Patent No.: US 9,221,003 B2
(45) Date of Patent: *Dec. 29, 2015

(54) FILTER

(76) Inventors: Klaus Schumann, Weil Am Rhein (DE); Gebhard Schumann, Sevzach (CH)

(*) Notice: Subject to any disclaimer, the term of this patent is extended or adjusted under 35 U.S.C. 154(b) by 804 days.

This patent is subject to a terminal disclaimer.

(21) Appl. No.: 13/475,389

(22) Filed: May 18, 2012

(65) Prior Publication Data

US 2012/0324842 A1 Dec. 27, 2012

Related U.S. Application Data

(63) Continuation-in-part of application No. 12/563,381, filed on Sep. 21, 2009, now Pat. No. 8,187,352.

(51) Int. Cl.
*B01D 46/02* (2006.01)
*B01D 46/06* (2006.01)
*B01D 46/08* (2006.01)

(52) U.S. Cl.
CPC ............... *B01D 46/06* (2013.01); *B01D 46/08* (2013.01); *B01D 2275/201* (2013.01); *B01D 2275/206* (2013.01)

(58) Field of Classification Search
CPC .. B01D 46/02; B01D 46/08; B01D 2275/201; B01D 2275/206
USPC ........ 55/378, 379, 492, 341, 302, 341.1, 490, 55/529; 95/280
See application file for complete search history.

(56) References Cited

U.S. PATENT DOCUMENTS

| | | | |
|---|---|---|---|
| 2,774,443 A | 12/1956 | Slayter | |
| 2,814,357 A | 11/1957 | Bowman | |
| 3,853,509 A | 12/1974 | Lelinert | |
| 4,084,948 A | 4/1978 | MacFarland | |
| 4,259,095 A | 3/1981 | Johnson, Jr. | |
| 4,291,904 A | 9/1981 | Iversen et al. | |
| 4,336,035 A | 6/1982 | Evenstad et al. | |
| 4,749,485 A | 6/1988 | DeGraffenreid | |
| 5,066,315 A | 11/1991 | Haberl et al. | |
| 5,118,421 A | 6/1992 | Scarano | |
| 5,230,726 A | 7/1993 | Smith et al. | |
| 5,858,039 A * | 1/1999 | Schumann et al. | 55/378 |
| 5,902,365 A | 5/1999 | Haggard | |
| 5,916,435 A | 6/1999 | Spearman | |
| 6,547,856 B2 | 4/2003 | Cartellone | |

(Continued)

FOREIGN PATENT DOCUMENTS

| DE | 806190 C | 6/1951 |
|---|---|---|
| JP | 09108519 A | 4/1997 |

OTHER PUBLICATIONS

European Search Report; European Patent Office; dated Apr. 23, 2013.

*Primary Examiner* — Duane Smith
*Assistant Examiner* — Minh-Chau Pham
(74) *Attorney, Agent, or Firm* — B. Craig Killough; Barnwell Whaley Patterson & Helms

(57) ABSTRACT

A filter bag is longitudinally formed with at least a portion of the filter bag formed in a frusto-conical shape. The filter bag has a plurality of radially extending members that form a propeller shaped cross-section. A lower, frusto conically shaped lower portion balloon or billows during a reverse air cycle enhances dust fall from the exterior for cleaning. A manifold having multiple openings is also disclosed.

14 Claims, 13 Drawing Sheets

(56) References Cited

U.S. PATENT DOCUMENTS

| | | |
|---|---|---|
| 6,833,023 B1 | 12/2004 | Vandenberghe et al. |
| 7,320,717 B2 | 1/2008 | Koeberle |
| 7,404,838 B1 | 7/2008 | Pathak |
| 7,485,592 B2 | 2/2009 | Kohli et al. |
| 7,597,773 B2 | 10/2009 | Kume et al. |
| 8,187,352 B2* | 5/2012 | Schumann et al. ............. 55/378 |
| 2002/0040569 A1 | 4/2002 | Reinhold |
| 2002/0129706 A1 | 9/2002 | Cartellone |
| 2002/0174770 A1 | 11/2002 | Badeau et al. |
| 2003/0177744 A1* | 9/2003 | Gerakios et al. ................ 55/378 |
| 2004/0034962 A1 | 2/2004 | Thur |
| 2005/0138903 A1 | 6/2005 | Jensen et al. |
| 2011/0067570 A1* | 3/2011 | Lambert et al. ................. 95/279 |
| 2012/0279185 A1* | 11/2012 | Appelo ........................... 55/378 |
| 2013/0227921 A1* | 9/2013 | Appelo ........................... 55/378 |

* cited by examiner

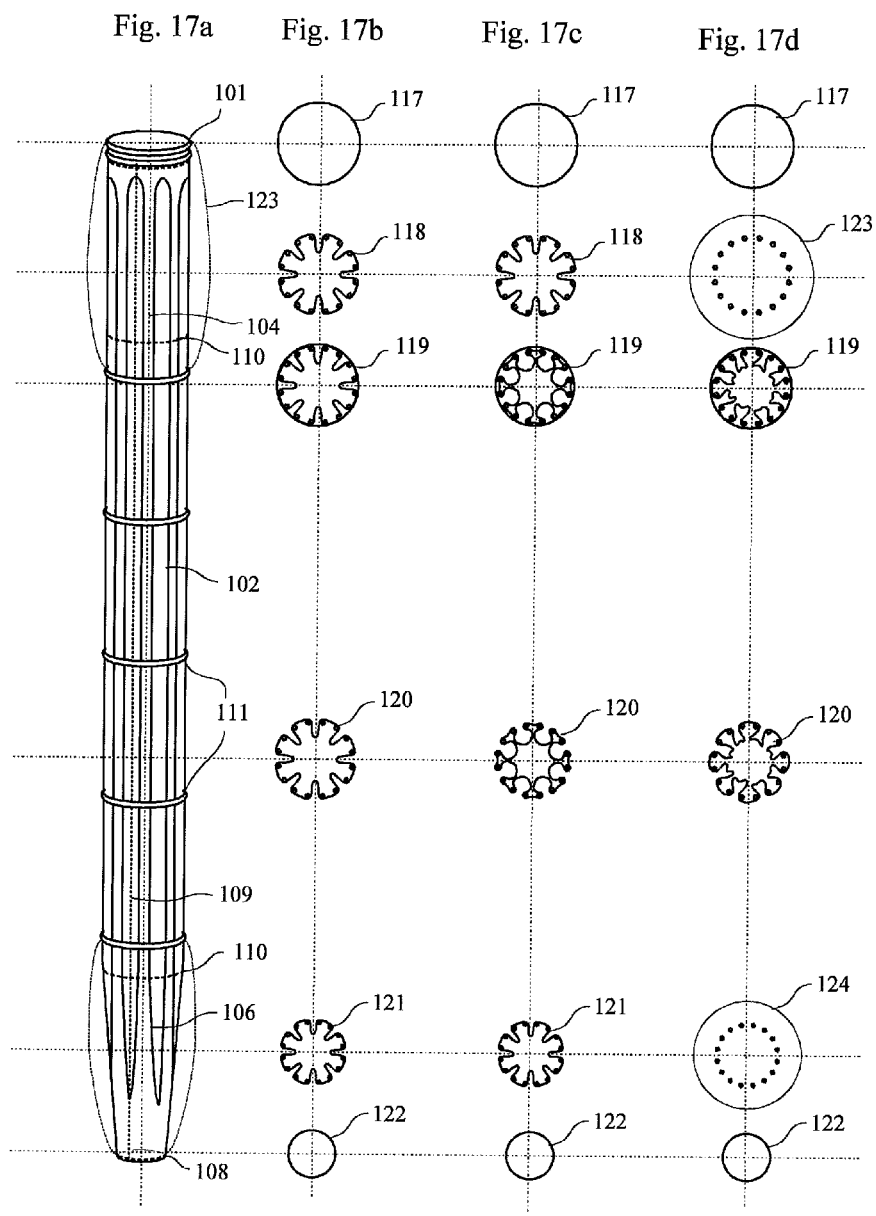

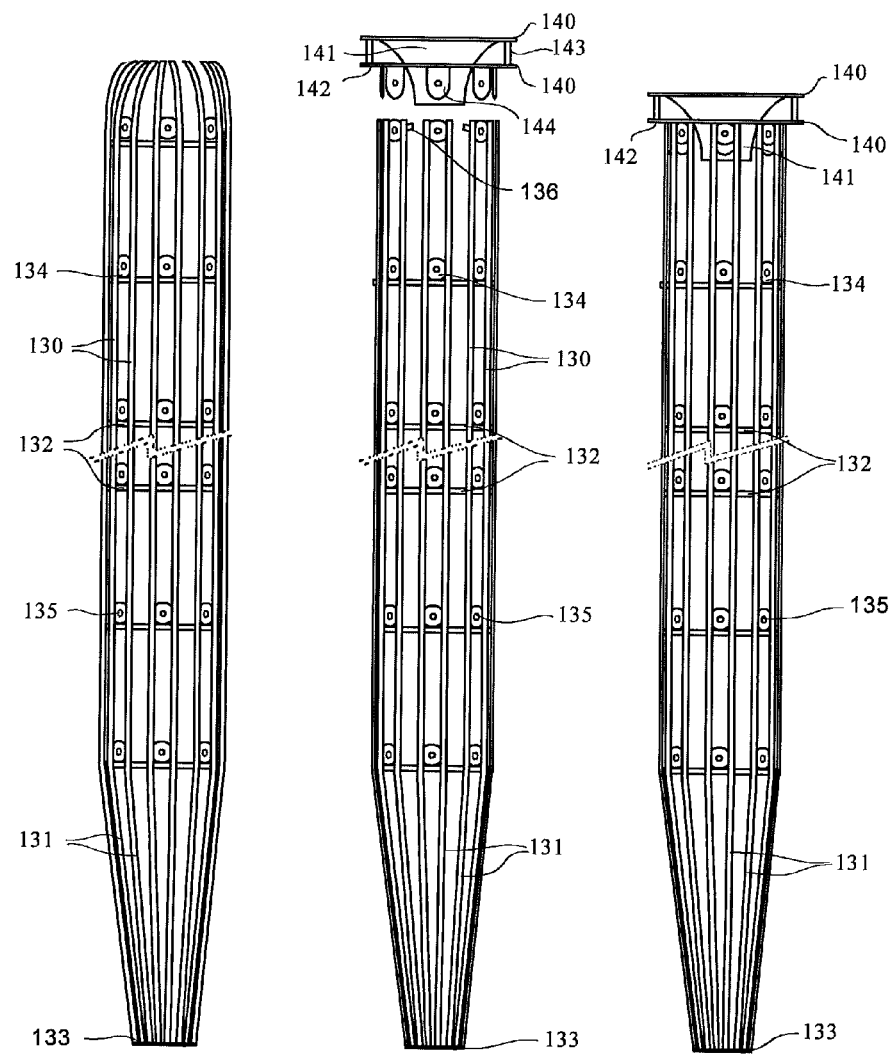

FILTER

This application is a continuation in part of application Ser. No. 12/563,381, filed Sep. 21, 2009 now U.S. Pat. No. 8,187,352 B2.

FIELD OF THE INVENTION

The present invention relates to filters used in air filtration generally and is more specifically related to pulse-jet filter elements and filter-cage assemblies, and to cartridge filters, of the type typically used in industrial applications.

BACKGROUND OF THE INVENTION

Filter elements in use have cylindrical filter bags, mounted onto cylindrical wire cages, which are installed by means of snap-ring fittings in the housing. Air is drawn through the filter bags during the filtration process. In pulse-jet filter applications, the air flow direction is reversed during the cleaning cycle.

The filter bags are closed on the bottom and open on the top. The dust laden air is drawn through the filter bag from an exterior of the filter bag, and the dust particles are retained on the surface of the filter bag. The air-to-cloth ratio, dust particle size, electrostatic properties of dust and filter cloth, can velocity, dust retention and cake-release of a given filter material and the filtration surface texture determine the efficiency of a filter. Pulse-jet filter bags are limited by the length and circumference of the filter bags and the can velocity due to the small open space between the circular filter bags hanging in the bag house. Improving efficiency by increasing the size of the filter housing, or increasing the number of filter bags, is expensive and is often impractical. The circular, sewed-on bottoms often protrude beyond the sides of the bags of the filter elements and become obstacles that catch and collect dust, which later impedes dust release in the cleaning cycle, and creates a negative impact on the can velocity at the bottom of the filter elements.

Similarly, cartridge filters have the disadvantage of being limited in temperature resistance and in length, which typically may not exceed two meters. High differential pressure causes the pleats to concave at the tips of the pleats, thereby reducing the effective filter area at this point. In addition, dust and other undesirable particles build up on the outside between the pleats and, in some cases, completely clog the cartridge filter. The extruding rim of the bottom plate of the cartridge filter is frequently an obstacle that catches and retains dust, preventing the collected dust from falling down into the hopper.

SUMMARY OF THE INVENTION

The filter has radially extending fingers or rays that yield a filter bag having a propeller-shaped cross section. The present invention significantly increases the filtration surface while using the same number of filter elements at the same gas volume, and also using the same bag diameter and bag length of conventional pulse-jet filter bags. Additionally, the structure of the invention reduces the air to cloth ratio, can velocity and differential pressures, which leads to significant efficiency gains with respect to emission values and energy consumption.

Radially extending portions of the filter elements lend a propeller shape to the device of the invention. The sides of the bag are formed to allow an easy release of dust during the cleaning cycle; and the propeller-shaped bottom of the bag has no obstacles that accumulate falling dust, thus enhancing dust-cake release during the cleaning cycle. By substituting normal pulse-jet filter element bags with frusto-conical, propeller-shaped moulded bottom filter element bags in a jet-filter bag-housing, this invention substantially increases the filter capacity of the bag housing, while simultaneously significantly reducing energy consumption and operating costs. The number of filter elements, as well as space needed for the new filter housing, is substantially reduced.

Filter 16a is a cross-sectional view of a conventional pulse-jet filter bag demonstrating a filtration cycle.

Figure 16A:
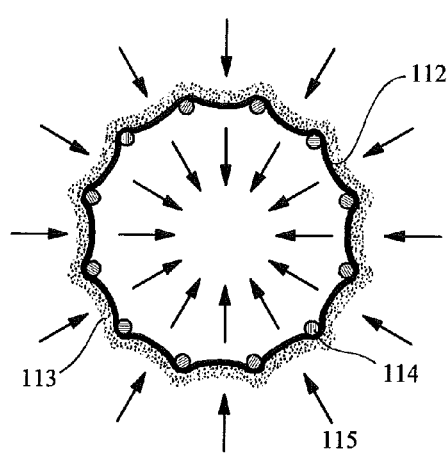
Figure 16C:
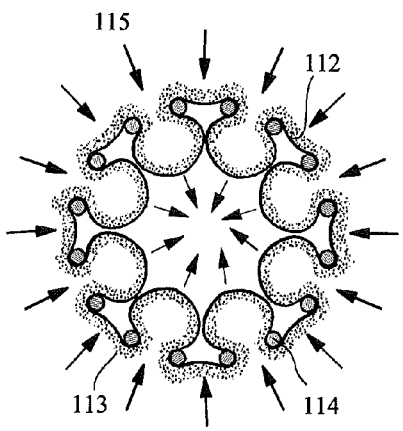
Figure 16B:
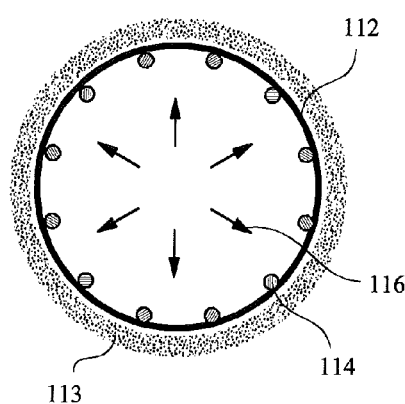

FIG. 16b is a cross-sectional view of a conventional pulse-jet filter bag demonstrating a compressed reverse-air cleaning cycle.

FIG. 16c is a cross-sectional view of the middle-portion of a propeller-shaped filter bag according to an embodiment of the invention demonstrating a filtration cycle.

Figure 16D:
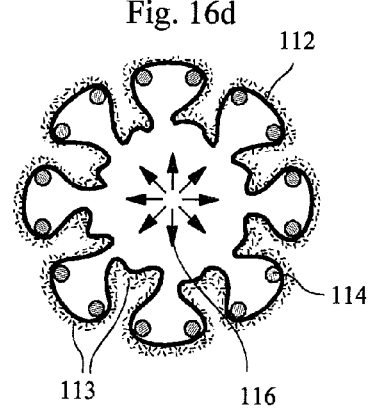

FIG. 16d is a cross-sectional view of the middle-portion of a propeller-shaped filter bag according to an embodiment of the invention demonstrating a compressed reverse-air cleaning cycle.

FIGS. 17a-17d demonstrate a comparison of the behavior of the filter media of a propeller-shaped filter bag according to an embodiment of the invention with a frusto-conical bottom-portion; the behavior of the filter bag is demonstrated at different positions on the filter bag under different filtration-process conditions.

Figure 15A:
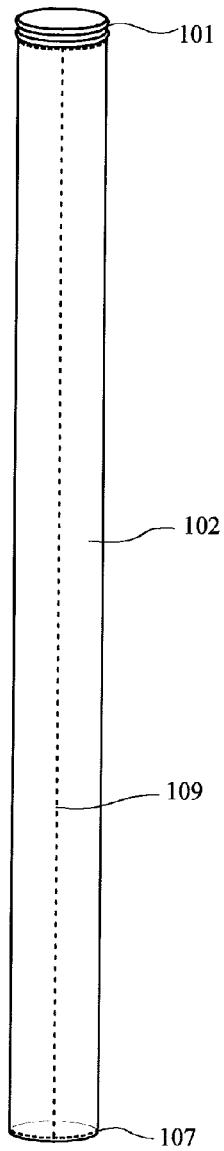
FIG. 15a shows a three-dimensional view of a conventional pulse-jet filter bag.
Figure 15B:
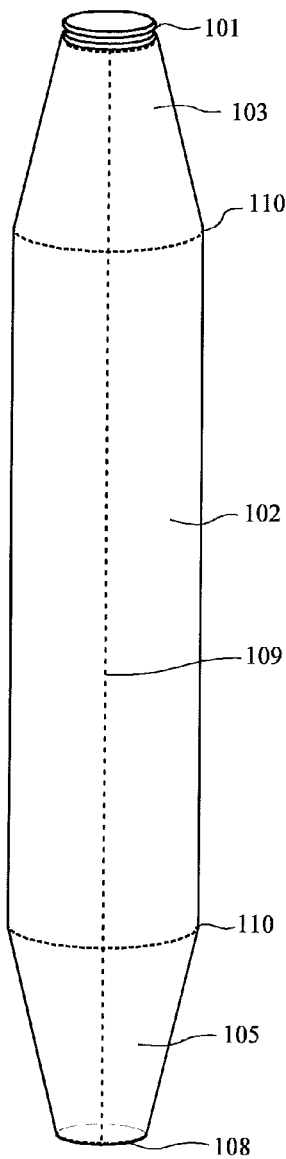
FIG. 15b shows an embodiment of the invention before it is completely fabricated, demonstrating the pattern-cut of a cylindrical middle section and frusto-conical upper and lower sections.
Figure 15C:
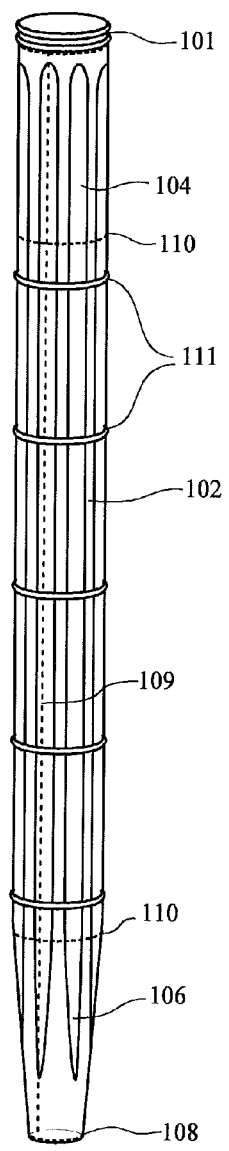
FIG. 15c shows the filter bag of FIG. 15b mounted over its inner cage, with the rays of the filter bag extending from the center in a propeller type array, with the ends of the rays enlarged.

FIG. 17a shows a three-dimensional view of a propeller-shaped filter bag according to the embodiment shown in FIG. 15c, having a frusto-conical bottom portion. The broken lines show the areas where the filter bag balloons out (billows out) in a cleaning cycle.

FIG. 17b demonstrates multiple cross-sectional views of the filter medium of a filter bag of FIG. 17a at different positions along the length of the filter bag when the filter bag is under no pressure, e.g. when the filter house is shut down and the ventilator is off.

FIG. 17c demonstrates multiple cross-sectional views of the filter medium of a filter bag of FIG. 17a at different positions along the length of the filter bag when the filter bag is under negative differential pressure, i.e. during the filtration process.

Filter 17d demonstrates multiple cross-sectional views of the filter medium of a filter bag of FIG. 17a at different positions along the length of the filter bag when the filter bag is under positive differential pressure, i.e. during the cleaning cycle.

FIG. 18a is an elevation of an inner cage construction for a propeller-shaped filter bag according to FIG. 15c, whereby the inner cage will hang freely inside a filter bag that is slightly longer than the cage.

FIG. 18b is an elevation of an inner cage construction for a propeller-shaped filter bag according to FIG. 15c having a manifold that is particularly useful.

FIG. 18c is an elevation of an inner cage construction for a propeller-shaped filter bag showing a manifold with two air-inlets fixed via rivets to the inner cage, and used with filter bags having a top gasket-ring.

Figure 19A:
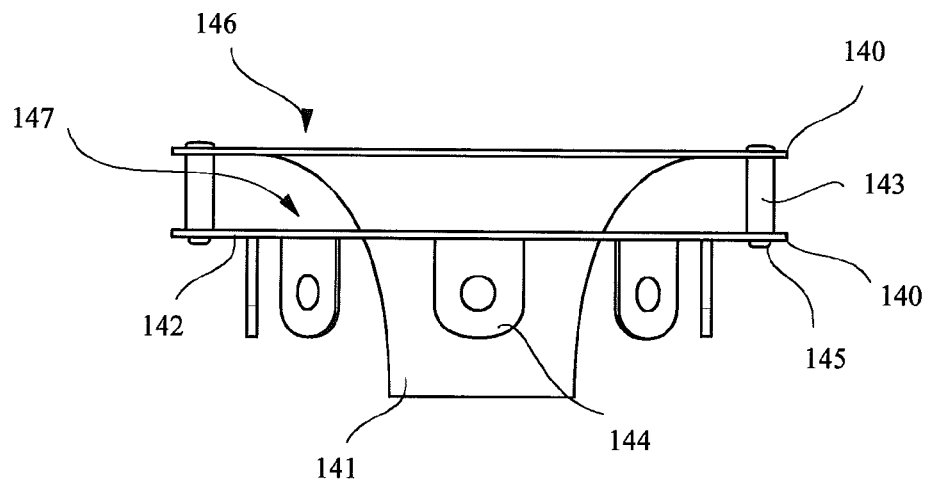

FIG. 19a shows an elevation of a manifold according to an embodiment of the invention in isolation.

Figure 19B:
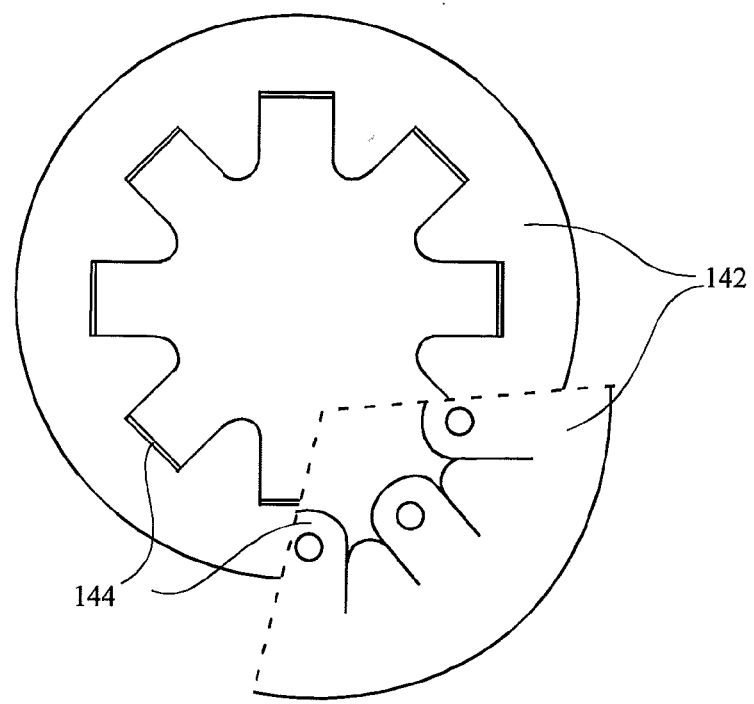

FIG. 19b shows a bottom view of a flange in the manifold shown in FIG. 19a according to an embodiment of the invention.

Figure 20:
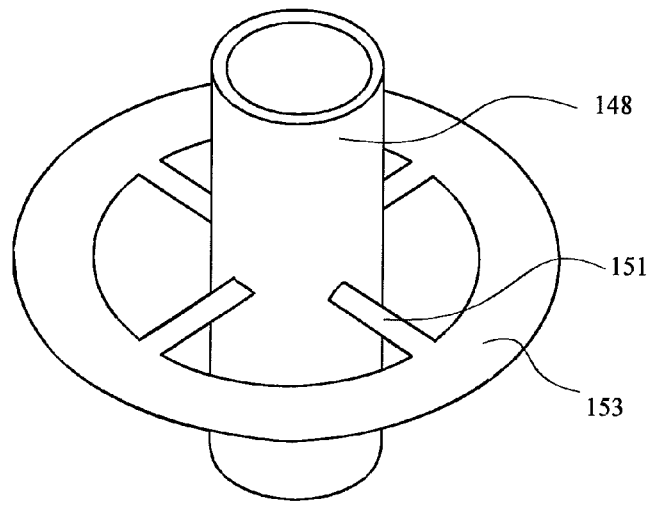

FIG. 20 shows an elevation of a manifold according to another embodiment of the invention.

Figure 21:
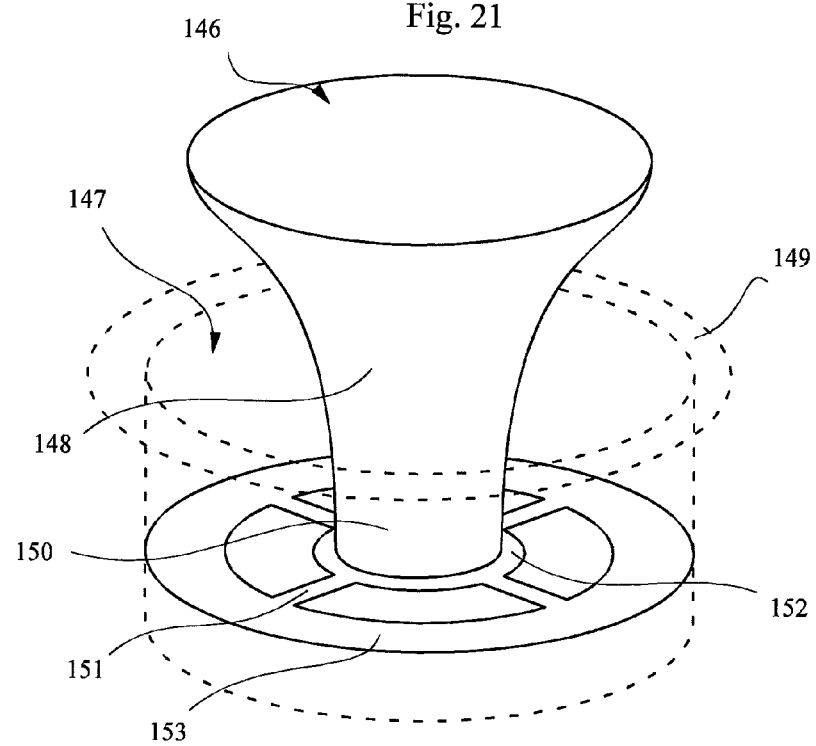

FIG. 21 shows an elevation of a manifold according to another embodiment of the invention.

DETAILED DESCRIPTION OF THE PREFERRED EMBODIMENTS

Figure 1:
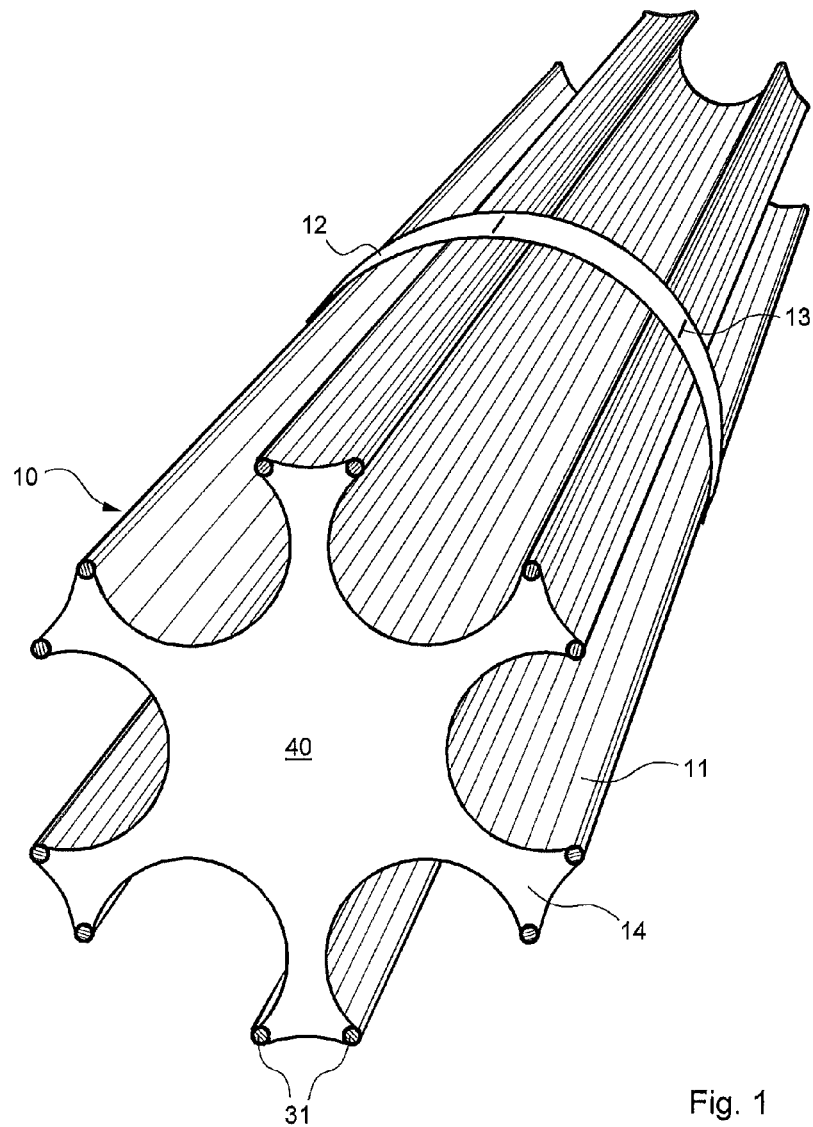
FIG. 1 is a perspective view of a 6-ray frusto-conical propeller-shaped embodiment of the fabric filter used in a filtration process.

FIG. 1 is a perspective view of a 6-ray frusto-conical propeller-shaped embodiment of filter bag 10. The filter bag is shown as used during a filtration process under negative differential pressure. A horizontal, circular band 12 may surround the filter bag. The filter bag 10 is comprised of filter cloth 11 which has a circumference that is materially larger than the circumference of the circular band 12. The circular band is preferred to be circumferentially attached in regular intervals by fasteners such as staples 13 or seams, or other techniques to the filter fabric 11, thereby holding the filter bag 10 permanently in a propeller shape 40. This design allows the filter cloth 11 known in the art, such as needled felt, non-woven material, woven material, warp-knitted, circular knitted, micro-filament or micro-fiber fabric, fiberglass and/or woven metal or monofilament filter material to form over the longitudinal wire pairs 31 of the inner cage 30 into a propeller shape during filtration, and hold this position during the reversal of air or gas flow during the cleaning cycle.

Figure 6:
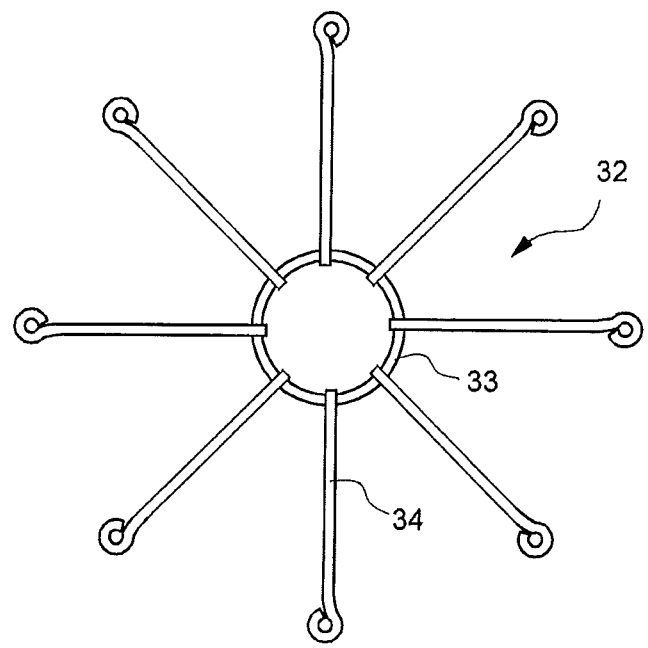
FIG. 6 is a cross-sectional view of the basic support element before forming to a required size (diameter of cage), with standardized ring and 8 standardized rays with eyes.

In a preferred embodiment, the propeller-shaped filter bag 10 is placed over a frusto-conical propeller-shaped support cage 30. This support cage is preferred to be formed by supports 32 and pairs of laterally offset frusto-conical longitudinal wires 31 that form the frusto-conical cage. FIG. 8. The longitudinally, evenly spaced supports 32, as shown in the embodiment of FIG. 6, are comprised of a ring 33 with radially-outwardly-in-equal-distance-arranged rays with eyes 34, which are bent to the proper diameter needed (FIG. 7), and may be connected by blind rivets 35 to the washers 36 holding together each pair of wires 31 and so forming a ray 14 of the frusto-conical propeller pattern. The filter bag as shown ends in a moulded propeller-shaped bottom 15 (FIG. 10), and may be installed by means of a ring 16, snap-band 17 or other fixture integrated in a top portion of the assembly, as shown in FIGS. 11-14.

Figure 2:
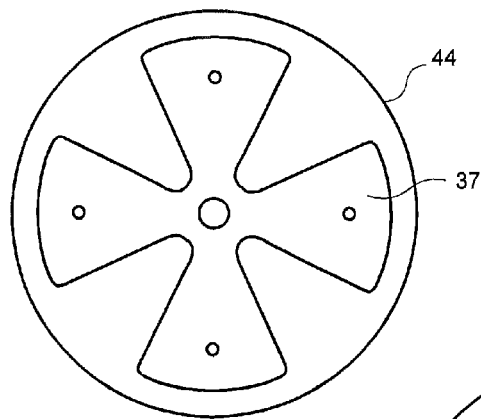
FIGS. 2, 3, 4, and 5 are cross-sectional views of different embodiments of frusto-conical propeller-shaped bottoms projected into the top open circle of the corresponding filter bags (cell plate and gasket size), demonstrating the frusto-conical form of each of these frusto-conical, propeller-shaped filter bags.

FIG. 2 shows a propeller-shaped metal end piece 37 of a 4-ray cage embodiment of the invention. This will support, for example, a 110/95 mm Ø frusto-conical propeller shaped bag 10 rendering, for example, about 54% more filtration area than a 110 mm Ø pulse-jet filter bag of the same length as previously known.

Figure 3:
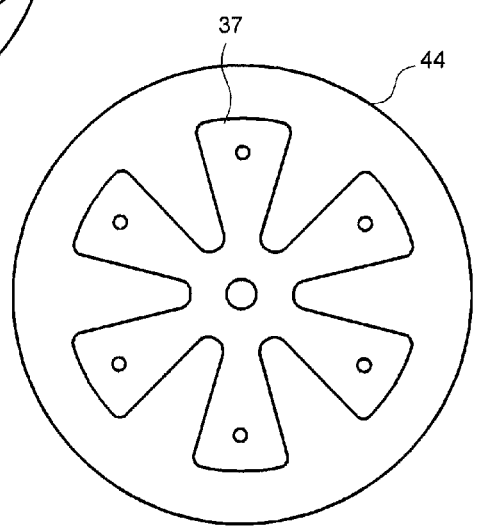

FIG. 3 shows an embodiment of the invention having a propeller-shaped metal end piece 37 of a 6-ray cage. A 140/115 mm Ø frusto-conical propeller-shaped bag 10 of this embodiment offers about 64% more filtration area in comparison to a 140 mm Ø 44 conventional pulse-jet filter bag of equal length as previously known.

Figure 4:
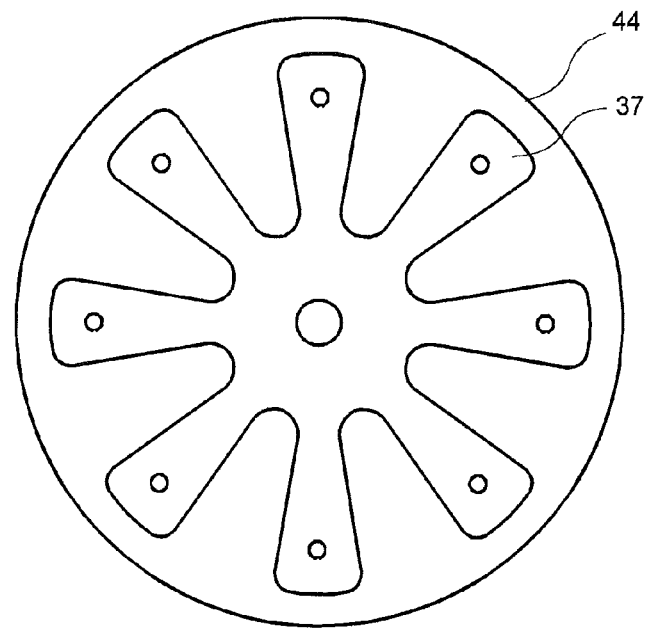

FIG. 4 shows an embodiment of the invention having a propeller-shaped metal end piece 37 of a 8-ray cage. A 150/130 mm Ø frusto-conical propeller-shaped bag 10 of this embodiment renders 100% more filtration surface than a 150 mm Ø 44 conventional pulse-jet filter bag of the same length as previously known.

Figure 4A:
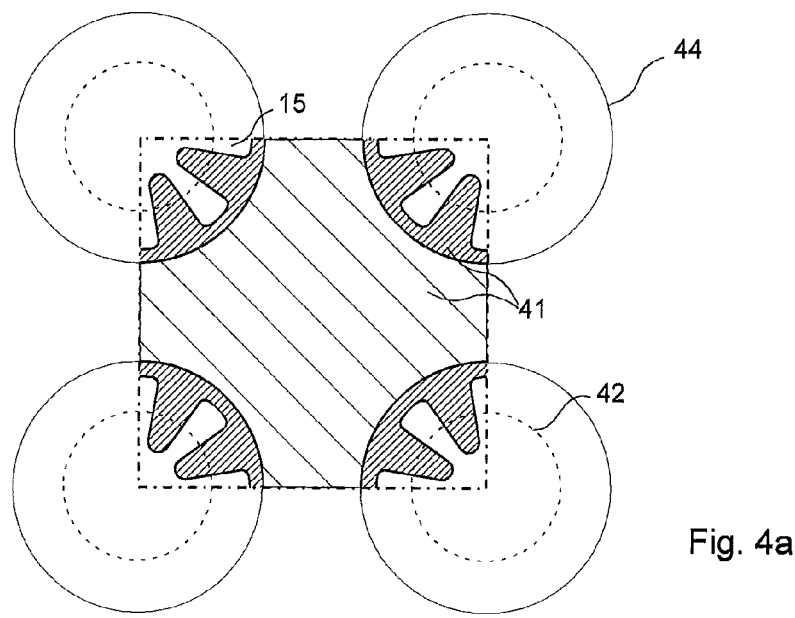
FIG. 4a demonstrates additional open space gained between the bottoms of frusto-conical filter elements in comparison to using cylindrical filter elements.

FIG. 4a shows a foot print demonstrating the additional open space 41 gained when replacing 150 mm Ø pulse-jet filter bags previously known with 150/130 mm Ø frusto-conical propeller-shaped filter bags 10 having moulded propeller-shaped bottoms 15. FIG. 4. In this embodiment, the gain of additional open space between the bags is 35%, reducing the can velocity by the same percentage, with a constant gas volume. By cutting the air to cloth ratio in half, the differential pressure will be reduced by about 40% or more. A mean diameter 42 of 100 mm Ø in connection with the propeller form 40 significantly reduces the particle migration from row to row of filters during the cleaning cycle. As a result, cleaning pressure can be lowered, for example, to as low as 2.2 bar, which will lead to higher filtration efficiency, and reduce particle-migration after the pulse-jet cleaning cycle. Energy savings of as much as 50% or more yields substantial economic gains, less wear-and-tear on the filter bag and, therefore, extended life-span of the filter bag.

Figure 5:
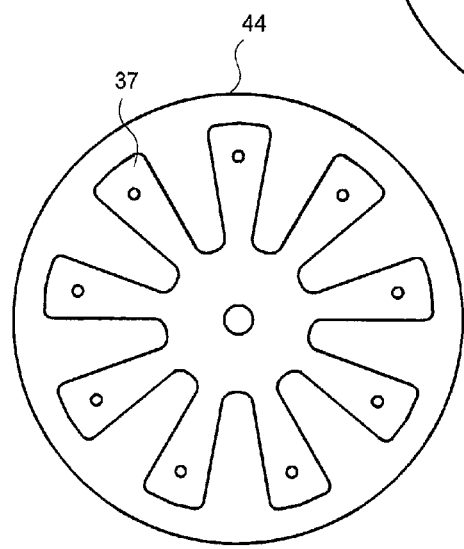

FIG. 5 shows a propeller-shaped metal end piece 37 of a 9-ray cage for a 170/145 mm Ø frusto-conical propeller-shaped filter bag 10 rendering 100% more filtration area in comparison to a 170 mm Ø 44 pulse-jet filter bag of equal length.

FIG. 6 shows a support element 32 comprised of a ring 33 with 8 radially outwardly and equally-spaced-apart rays with eyelets 34. For all known bag diameters 44 of this embodiment, the same ring 33 and the same rays with eyelets 34 can be used, which will be bent to the required diameter as shown in FIG. 7.

Figure 7:
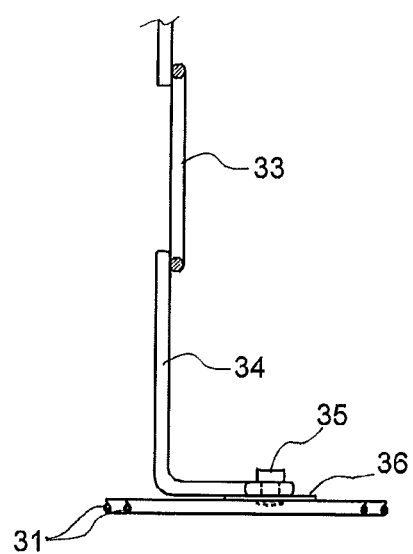
FIG. 7 is a cross-sectional view of the ring and one ray with eye of FIG. 6 bent 90° to the diameter size of the frusto-conical propeller-shaped support cage.
Figure 8:
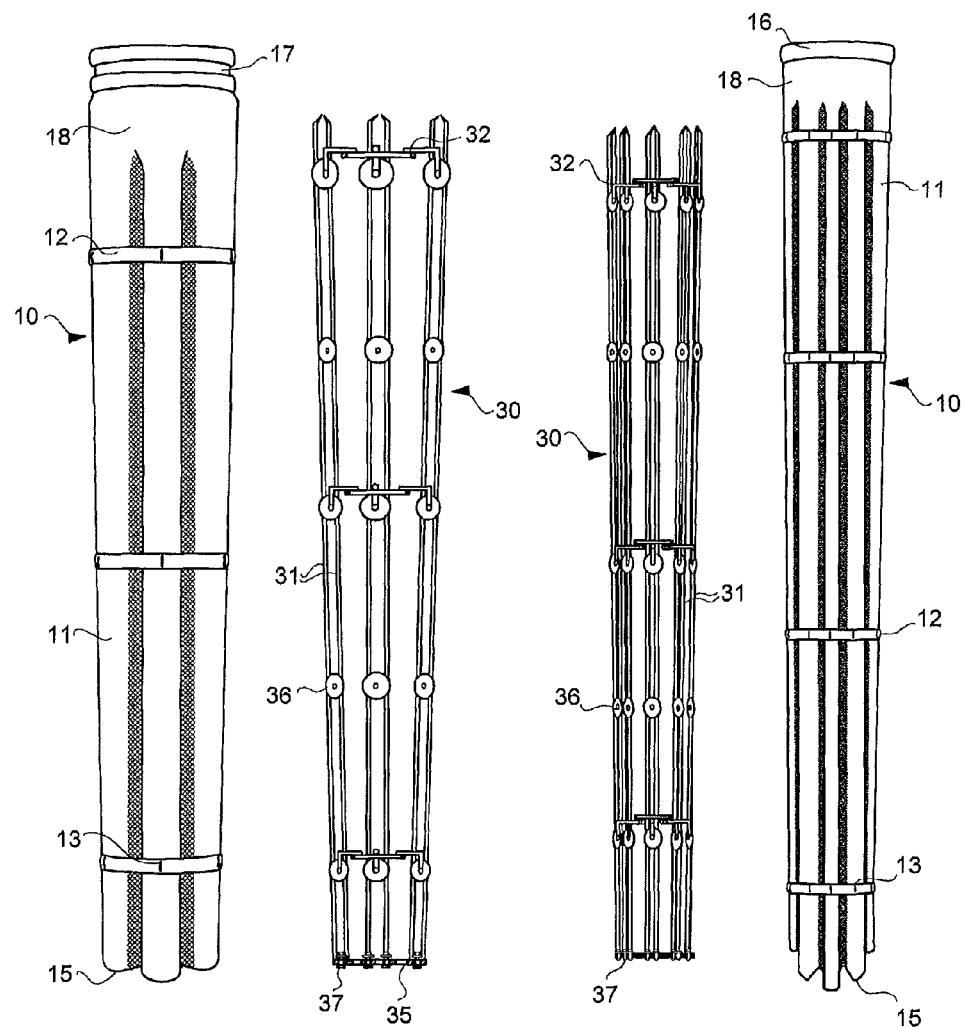
FIG. 8 is a plan view of two typical, but dimensionally different, frusto-conical propeller-shaped filter elements having appropriately shaped bags with accompanying inner propeller-shaped support cages.

FIG. 7 discloses an embodiment comprising pairs of laterally offset and frusto-conical longitudinal wires 31 that are connected by means of blind rivets 35. The wire pairs are separately made to length by spot welding special washers 36 in-equal-distance to both wires.

FIG. 8 shows an embodiment of two typical frusto-conical propeller-shaped filter bags 10 without box-pleats 18 at the top, and with moulded propeller-shaped bottoms 15. One filter bag is a 4-ray version with snap band cuff 17 and one filter bag is an 8-ray version with ring cuff 16. The corresponding frusto-conical propeller-shaped support cage 30 is shown beside its filter bag.

Figures 9, 10:
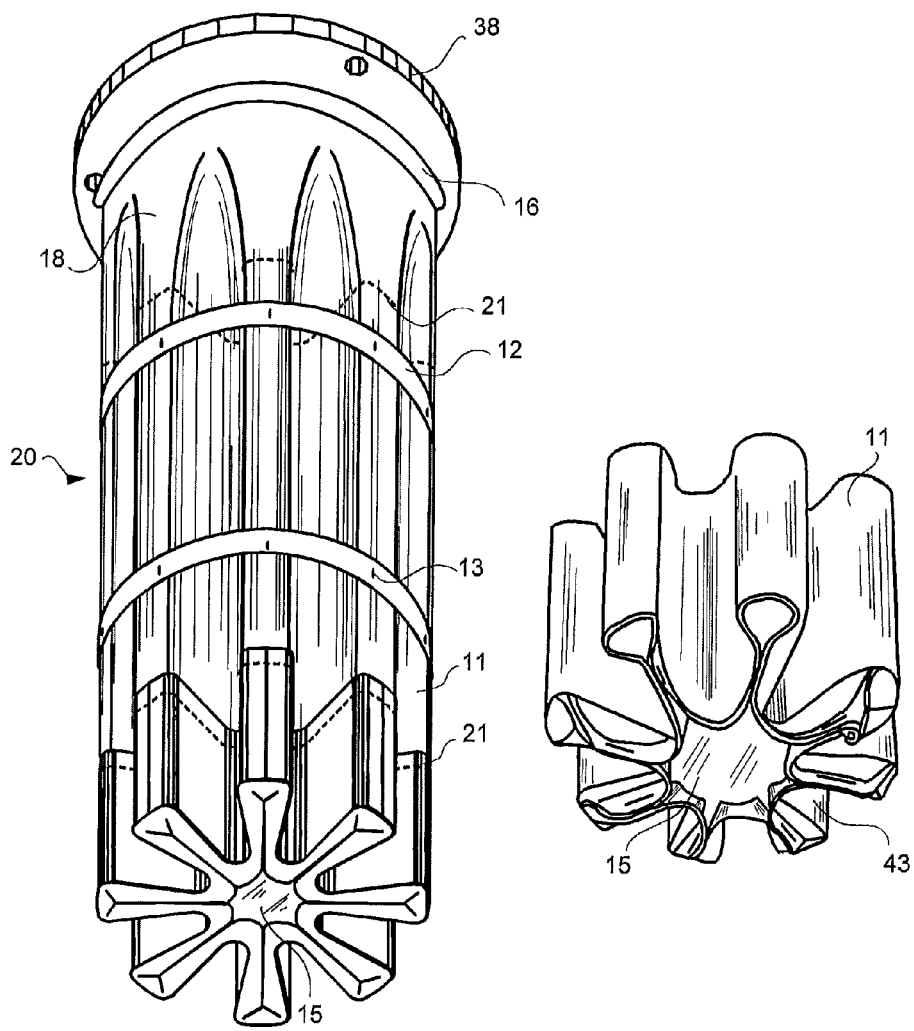
FIG. 9 is a plan view of a frusto-conical propeller-shaped filter element having an appropriately shaped bag with an integrated flange to replace a typical pleated cartridge filter element or filter bag.
FIG. 10 is a perspective view of a propeller-shaped moulded bottom or boot.

FIG. 9 shows an embodiment of a frusto-conical propeller-shaped cartridge filter element 20 having a bag without box-pleats 18 at the top, with top ring cuff 16 and with a moulded propeller-shaped bottom 15 mounted on an exchangeable frusto-conical, propeller-shaped support cage 30 with a top flange 38. The much higher air to cloth ratio of this cartridge filter bag will more than compensate for the smaller filtration area in comparison to a star-like pleated cartridge filter. The moulded propeller-shaped bottom 15 and the drop-off sides 43 reduce the can velocity, improve the cleaning efficiency, and will not allow the filter bag to clog up as is so often experienced with conventional pleated cartridges with agglomerating dust, e.g. wet paper dust, and dust from plasma welding or laser cutting.

FIG. 10 shows an embodiment of a typical 8-ray moulded propeller shaped bottom or boot 15 with open drop-off sides 43. This boot can be economically produced and attached to the main filter body, such as by sewing a horizontal seam 21. FIG. 9.

Figure 11:
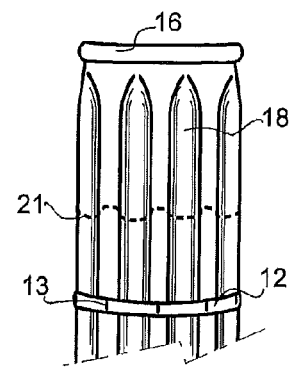
FIG. 11 is a side view of the top of an 8-ray frusto-conical propeller-shaped filter bag without pleats and with ring cuff.

FIG. 11 shows a preferred version of a top without pleats 18, and having a ring cuff 16.

Figure 12:
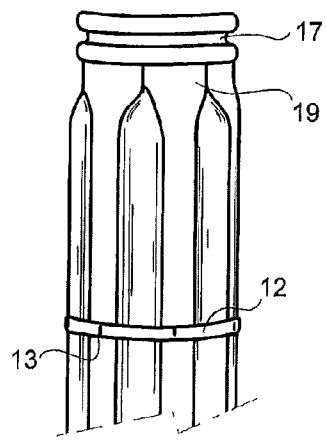
FIG. 12 is a side view of the top of a 6-ray frusto-conical propeller-shaped filter bag with box pleats and snap-band cuff.

FIG. 12 shows another version of a top with box pleats 19 and snap-band cuff 17.

Figure 13:
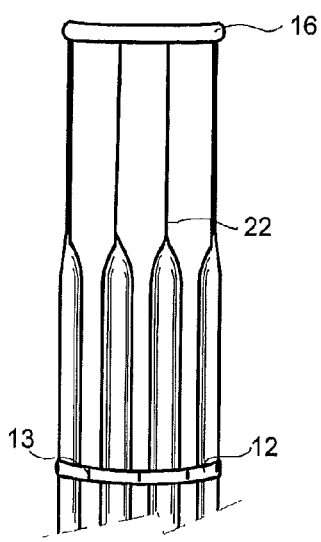
FIG. 13 is a side view of the cylindrical top part of a 8-ray frusto-conical propeller-shaped filter bag with a ring cuff, which is preferred when using interior venturis.

FIG. 13 shows an embodiment showing cylindrical top with ring cuff 16 and inner overlap seams 22 as recommended for interior venturis.

Figure 14:
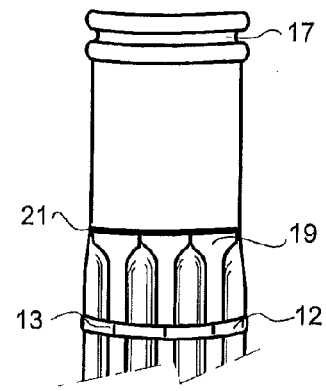
FIG. 14 is a side view of the top part of a 8-ray frusto-conical propeller-shaped filter bag, whereby a cylindrical cuff with a snap-band is sewed onto a propeller-shaped filter bag with box pleats, which is preferred when using interior venturis.

FIG. 14 shows a cylindrical top with snap-band cuff 17 sewed with a horizontal seam 21 onto a propeller-shaped filter corpus with box pleats 19, which is preferred for interior venturis.

In the preferred embodiment shown in FIGS. 9 and 11, the filter cartridge and filter bag are without pleats at the top and have a moulded bottom. Both filter bags are open at the top and closed on the bottom. The bottom piece of the frusto-conical propeller-shaped fabric filter is moulded in the exactly required radially extending propeller form and may be secured by fasteners such as metal clamps or staples.

Polyurethane, silicone or other mouldable material may be used to form the moulded bottom of the filter bags. The very top of a preferred filter bag is not propeller-shaped, but is cylindrical. Snap-band rings with double-beaded gaskets, felt strips, rings or other conventional installation methods may be employed for mounting the filter bags. The open top can therefore be made to fit any standard cell plate and gasket size.

The filter media may be chosen from many materials used for industrial dust filtration, and may be needled felt, non-woven, woven material, warp-knitted, circular knitted fabric also out of micro-filament yarn and fibers, fiberglass and/or metal-fabrics, and others. The length and diameter of the filter bag is variable in accordance with the needs in line of the filter housing dimensions. A preferred filter bag of the invention comprises filter media which can withstand temperatures up to 280° C.

Interior venturis or special types of filter material (e.g. glass, woven, light-weight-spun-bond material) may make it desirable to deviate from the preferred pleat-free open top form and to use a box-pleat design sewed onto a tubular top FIG. 14 or an inner overlap-seam design, forming a tubular top. FIG. 13.

Attachment devices, such as bands positioned on the exterior of the filter bag may be used to give the filter bag the multi-propeller-blade shape, and also prevent the filter bag from expanding too much during the pulse-jet cleaning cycle. The bands are placed generally horizontally around the filter bag at calculated intervals along the length of the bag. The smaller outer-circumference of the filter bag is created by matching marks on the band to proportionally-greater-distanced marked points on the bags. These marks are then joined together by sewing, stapling, or other techniques.

The filter bag must have an inside support, which may be a cage. To meet the needs of the individual application, this cage is preferred to be constructed of rigid materials such as steel or stainless steel, whereby all steel parts can be treated or coated as required. The cage may have, for each propeller-blade, a pair of wires forming a frusto-conical shape along the length of the cage from the riveting points of the supports, which are placed at regular intervals down the length of the cage. The filter material is preferred to touch the cage only along the edges of the wires, which minimizes mechanical abrasion and also allows full use of the filter material as a filtration surface.

The filter cages may be constructed as a single piece or they may be delivered in an assembly set, to be mounted together on the location site with fasteners such as rivets. Long cages may be constructed in two pieces, with tubular inner joints, to be assembled during installation.

The invention as disclosed in this embodiment may be used to replace cartridge filters, with the definitive advantage of having drop-off sides that have no obstacles to catch and retain dust and polluted particles. The cage with the preferred top flange is reusable when the frusto-conical, propeller-shaped fabric filter bag is replaced.

The filter bag according to the invention achieves a filtration surface which is 1.5 to 2 times as large as a conventional pulse-jet filter bag of the same top diameter and length. Moreover, when the resulting filter bag is stabilized by a frusto-conical, propeller-shaped support cage 30 and horizontal and usually annular bands 12 the filter material 11 of the bag is moved more gently at lower pressure during the pulse-jet cleaning cycle. The frusto-propeller shaped design has less inner-bag air volume (as in comparison to conventional cylindrical filter bags) which reduces the compressed air and energy consumption needed during the pulse-jet cleaning cycle, permitting that the frusto-propeller-shaped filter bags and cartridges can be cleaned less aggressively in comparison to conventional pulse-jet filter bags.

FIGS. 15b and 15c as well as FIGS. 16c and 16d demonstrate an additional variation of an embodiment of a filter bag and filter element according to the invention. FIGS. 16c and 16d show cross-sectional views of the new filter bag in comparison to cross-sectional views of a conventional filter bag. FIGS. 16a and 16b. The new filter bag has a propeller shaped cross section like the filter bag discussed above, having a plurality of rays, such as 4, 6, 8 or 9 rays, according to the application. The rays are preferred to have enlarged ends as shown in the drawing figures.

The filter bag of this embodiment has a generally cylindrical middle section and a frusto conical lower portion when mounted over an inner cage as shown in FIG. 15c. The filter bag may be constructed of filter media not having a moulded bottom in a preferred embodiment. An exemplary pattern-cut of the cloth bag according to this embodiment is shown in FIG. 15b. The bag may be formed in three pieces, having a cylindrical middle section, a frusto-conical lower section and a frusto-conical upper section. FIG. 15b shows the design of the filter bag, when the filter bag may be lying on a flat surface, after the upper-, middle- and lower portions of the filter bag have been sewed together by over-lapping, horizontal seams and a longitudinal seam has formed a longitudinal filter bag, displaying the shape of the filter bag before the horizontal attachment bands are fastened, such as by sewing or stapling The apparently excess cloth or textile or other filter material in FIG. 15b will afford the propeller shaped rays after the horizontal bands have been attached to the filter bag and it is mounted over the inner cage. When the attachment devices, such as the horizontal bands, which may be annular bands, are attached to the middle portion of this filter bag, the filter bag will take on the shape found in FIG. 15c.

The filter bag will then have the relative shape and size shown in FIG. 15c.

In a preferred embodiment, the bag is formed with sufficient excess material so that a propeller shaped cross-section is formed in the middle portion of the filter bag. These rays continue into the upper- and lower portions of the filter bag where they may reduce in height and eventually disappear so that the filter surface is rendered flat on the very top of the upper portion and on the lowest part of the lower portion of the filter bag. The stream-lined design permits a total absence of obstacles (e.g. box pleats or protruding filter material) to hold and collect dust on the filter bag. Due to lack of horizontal bands on the upper- and lower portions of the filter bag, these portions of the filter bag have no resistance to billowing out when reverse-air is pulsated into the filter bag during pulse-jet cleaning cycle. The areas of billowing out are demonstrated by the ghost lines in FIG. 17a. Such billowing out permits an excellent condition to expulse the filter dust from the filter bag, dust that had been sucked onto the filter medium surface during the filtration process.

To form the embodiment shown in FIG. 15b and FIG. 15c, three pieces of material may be designed, cut and sewed together by overlapping seams. Horizontal bands are preferred to be attached only to the middle-part of the filter bag at calculated distances to each other so that the upper and lower portions of the filter bag will billow out during the cleaning cycle. A tubular form may be achieved by a longitudinal seam. The horizontal bands are attached such as by seams or staples. A snap-band or ring may be sewed on at the top-part of the filter bag. A small, flat, circular piece of filter fabric may be sewed on as a bottom-piece.

The general form of the embodiment of FIG. 15c is preferred to have the same length and cell-plate fit of a conventional pulse-jet filter bag yet to render more filtration surface, e.g., the filter bag shown in FIG. 15a may have dimensions of 160Ø×2000 mm and comprise a 1.04 m² filtration surface, while the embodiment of the invention in FIG. 15c may have dimensions of 160Ø top/90Ø bottom×2000 mm length, rendering a 1.94 m² filtration surface. The length of the middle portion of the filter bag 102, as a percentage of the overall length of the filter bag, will increase as the length of the bag increases. Typically, the middle portion will range from about 60% to about 85% of the overall length of the filter bag.

FIG. 18 a-FIG. 18c show three embodiments of top or upper structures for the inner cage construction for the propeller-shaped filter bag according to FIG. 15c. The inner cage of the filter element for the embodiment of FIG. 15c may be constructed as described above in FIGS. 6, 7, and 8, except that the upper- and middle part of the inner cage in this embodiment of the invention remains cylindrical while the lower part of the inner cage is frusto-conical in order to support the design of the filter bag.

In FIG. 18b the filter bag may be installed with the inner cage already inserted. When the filter bag is positioned via a snap-band in the cell plate, the top part of the inner cage may be pulled upwards in order to put the pins of the inner cage into the mounting links of the manifold. The inner cage with manifold attached may then be lowered into the snap-band until the flange sits on top of the snap-band, so that the pins in the mounting links are held securely in their holes by tight cell-plate fit.

The embodiment of FIG. 15b is preferred, by the cut of the pattern, to avoid box pleats. Three pieces of material 102, 103 and 105 may be cut and sewed together by overlapping, horizontal seams 110 to create a filter-bag model. FIG. 15b. Horizontal bands 111 are shown as attached only to the middle-portion 102 of the filter bag at calculated distances to each other. FIG. 15c. A tubular form may be made by longitudinal seam. The horizontal bands 111 may be joined together by a seam or staple; a snap-band 101 or ring may be sewed on at the top of the upper portion 104 of the filter bag; and a small, flat, circular bottom-piece 108 of filter fabric may be sewed on the bottom of the filter-bag. The bands hold the middle portion of the filter bag, which is preferred to be generally cylindrical, snugly against the filter cage, since the ballooning of billowing preferred in this embodiment does not occur with the middle section.

Propeller-shaped rays may be present on as much as 85% of the length of the filter bag (as determined by the length of the filter bag), with the propeller-shaped rays not continuing to the bottom of the filter bag. The rays of the cylindrical, propeller-shaped middle part of the filter bag may produce a reduction in height as they continue upwards to the upper portion of the filter bag and downwards to the under portion of the filter bag where they eventually run out to form flat surfaces. The diameter and volume in the lowest part of this embodiment of the filter bag is less than that needed for propeller-shaped, frusto-conical filter bags having propeller-shaped rays that continue to the bottom of the filter bags, whether this filter bag has, or does not have, a moulded bottom-piece.

The upper- and lower parts of this embodiment of the filter bag render no obstacles, such as box-pleats, to catch dust, thus providing improved filtration and cleaning capacity. The open space between the propeller-shaped rays does not allow dust to pack in, as occurs with box pleats and in cartridge filters, since in this embodiment of the invention there is no structure to entrap the dust. The reduced diameter provided by the frusto-conical bottom-part of this embodiment of the filter bag facilitates dust falling into a hopper during the cleaning process, and also renders more open space between multiple bags hanging in a bag house, an open space which affords a reduction in can velocity and, furthermore, helps prevent long filter bags (e.g. 3 meters or longer) from banging against each other, hereby helping to avoid damage and perhaps effecting a longer life span for the filter bags. By having increased open space between the lower-parts of the filter bags, and by reducing can velocity, dust particles may fall more easily. This is very important for problematic dust particles such as super-light-super-fine aerosol-like dust.

In the embodiment shown in FIGS. 15*c* and 17*a*, when air flow is reversed and jetted into the filter bags during the cleaning cycle, the receding (sunken-in) portions of the propeller-shaped rays plus the ray-less, flat-surfaced area at the upper- and lower portions of the filter bag balloon out such as when one blows air into a paper sack. This permits dust to be released from the filter bag and thrown off. If the rays are held in position by a moulded bottom, the rays are not free on the lower portion of the filter bag to billow outwardly during the cleaning cycle.

FIGS. 16 and 17 demonstrate the behavior of the filter media of the invention having a frusto-conical bottom-portion and compare this behavior to that of a conventional pulse-jet filter bag. The behavior is shown at different positions along the lengths of the filter bags and under different filtration processes. The additional surface area (in comparison to conventional pulse jet filter bags) during filtration, and the significant shape change (billowing out of the upper- and lower portions of the filter bag) during cleaning that assists in removing filtered particles from the surface of the filter medium, are demonstrated in these Figures.

The filter bag is designed to surround an inner cage that hold the form of the propeller-shaped and frusto-conical filter bag during the negative differential pressure of the filtration process. In the cleaning cycle, the air is reversed and jetted into the filter bags in order to throw off the dust that has been sticking to the filter medium on the outside of the filter bags in an effort to "clean the bags."

Due to the middle portion of the filter bags being secured to the inner cage, the billowing or ballooning out of the middle portion of the filter bag is limited. The middle portion of the bag can only billow out in the cleaning cycle to the extent permitted by the securing device or devices, which as shown in the drawings and in a preferred embodiment, is the circumference of the annular bands that hold it over the inner cage. Therefore, the middle portion of the filter bag does not increase its circumference during the cleaning cycle.

The upper part of the lower portion of the filter bag—and the lower part of the upper portion of the filter bag—may have rays which reduce in height to form a flat surface at the very bottom of the filter bag and at the very top of the filter bag. The upper and lower portions of the filter bag do not have annular bands or other securing devices that prevent billowing out or the bag during the cleaning cycle. The rays on the upper- and lower portions of the filter bag causes the filter bag to be much larger than the circumference of the inner cage as the bag billows out due to the pressure during the cleaning cycle.

However, the circumference of the upper- and lower portions of the filter bag are materially larger than the inner cage only during the cleaning cycle due to the reverse air allowing the portion of the filter bag where the rays are found on the upper- and lower portions of the filter bag to billow out. This is not true in the normal filtration process where positive differential pressure causes the rays to be sucked into their proper position against the inner cage.

The advantages gained in using the preferred filter include:
lower differential pressures
lower can velocity
less particulate migration after pulse cycle
meeting highest emission standards due to better fine dust retention
enhanced dust-release due to propeller form, flex motion and slick, drop-off sides
frusto-conical propeller-shaped support cage that can be assembled on the site substantially facilitates transportation and reduces its costs The propeller shaped filter bag according to the invention, lowers energy cost, and increases the capacity and usable life span of filter bags, thereby reducing operating cost.

The filter cages according to the invention may be used with novel manifolds, examples of which are shown in the FIGS. 19, 20 and 21.

FIG. 19*a* is an elevation of a riveted-together manifold having two air-inlets, demonstrating the basic composition of a flange and a venturi.

FIG. 19*b* demonstrates a bottom plan view of FIG. 19*a* whereby the mounting links are bent 90° towards the viewer (and are not viewable from this position), such bottom plan view having a magnified view to show the prior design of the cut of this section of the metal flange before the mounting links (having holes where pins may be inserted) are bent 90° towards the viewer.

FIG. 20 shows an additional embodiment of a metal manifold with two air-inlets, whereby the barrel of the venturi proceeds below the level where wires may be welded onto the flange. This barrel can be as portrayed, or it can be extended downwards to any length desired and can be extended upwards to form a short or longer trumpet-part of the venturi according to the height and design desired.

FIG. 21 shows yet another embodiment of a metal manifold with two air-inlets. The barrel of the venturi does not proceed below the wires of the flange, but is placed on a platform-ring that has been attached, such as by welding, onto wires that fuse it to the flange, which is in turn attached, such as by welding, onto a metal flange-cuff having a rim which is positioned on top of the snap-band that is situated in the cell plate.

A manifold having two air-inlets according to an embodiment of the invention may be a steel or stainless steel flange 142 with preferably a steel or aluminum venturi 141. The venturi provides two air-inlets 146+147 that allow air to enter a pulse-jet filter bag during the pulse-jet cleaning cycle. The venturi 141 and the flange 142 may be held apart by distance-holding members, such as the three metal tubes 143 shown in the drawings. The tubes may be attached by fasteners, such as rivets, to the top of the flange 142 and to the underneath side of the rim of the venturi 141, in order to unite the venturi 141 and the flange 142. The venturi 141 and the flange 142 are preferred to be held together at equal height. FIG. 19*a*. The manifold may be mounted to the upper washers 134 of the parallel, longitudinal wires 130 of the inner cage by means of pins that are inserted into the washers 134 on the parallel, longitudinal wires 130 and secured by fasteners, such as rivets. The pins are preferred to penetrate the holes on the mounting-links 144 on the underneath side of the flange 142.

The filter bag may be mounted on the inner cage before it is installed in the filter housing. The filter element may enter the cell-plate hole where the snap band will be fitted. The inner cage may be pulled upwards and out of the cell plate hole in order to press the pins attached to the parallel, longitudinal wires 130 of the inner cage into the holes on the mounting-links 144 of the flange 142, thereby connecting the manifold to the inner cage. The inner cage, with mounted manifold, may be pressed into the snap band, so that the flange of the manifold is held in position tightly on top of the snap band. The tight fit of the snap band holds the pins of the inner cage securely into the mounting-links 144 of the flange.

The manifold according to the invention in FIG. 18*b* may have a short, cut-off barrel on the nozzle-end, and mounting holes to attach the venturi to the flange. Attachment may be accomplished with short metal tubes attached by fasteners, such as rivets. The steel flange may have mounting links with holes for attachment to washers of parallel, longitudinal wires of the inner cage of a propeller-shaped, pulse-jet filter bag. Attachment may be pins fastened such as by riveting onto washers that have been fixed on the parallel, longitudinal wires.

Other embodiments of the manifold may provide:
(1) A welded manifold that is pinned onto the top washers on the parallel, longitudinal wires of a riveted together inner cage;
(2) A welded manifold that is welded on the parallel, longitudinal wires of a welded together propeller-shaped inner cage;
(3) A manifold wherein the second air-inlet comprises a plurality of wires, such as four wires, positioned at equal distance to each other and forming a flange, with a venturi welded onto the four wires;
(4) The manifold according to (3) may also be attached to the inner cage by means of pins as described above.

In examples 3 and 4, the venturi may protrude above the cell-plate into the clean-air room, and provide a second air-inlet above the flange and underneath the rim of the venturi. This venturi may be long or short, according to the fabric filter system employed.

The manifold of the invention affords a reduction in compressed air pressure in the cleaning cycle of propeller-shaped, pulse-jet filter elements. It is believed that the air pressure of the cleaning cycle may be reduced from 5-6 Bar to about 2.2-2.5 Bar in some applications. The manifold according to the invention also allows for more even distribution of compressed air into the interior of the filter bag, by positioning the central axes of the venturi and the filter inner cage substantially in a completely vertical position. Stress and wear-and-tear caused when venturis are mounted on a bent cell plate is hereby reduced. In hot gas applications, the second air-inlet helps to avoid condensation during the cleaning cycle, because it allows that hot gas from the hot clean-air room (at temperatures of 140° C.-160° C. and higher) is drawn into the filter bag, where it acts like a curtain of hot air towards the filter fabric in contrast to the cold compressed air being brought into the filter bag through the venturi. The hot gas curtain will also help to prevent the temperature from declining under the dew point during the cleaning cycle. This is very important when using filtering firing processes, e.g. as in coal-fired boilers, where it is important to keep the temperature above the dew point in order to avoid the creation of sulphuric acid, which is destructive to many filter media.

By reducing the required compressed air pressure, the invention will reduce the amount of electricity or other energy needed for the cleaning process, enhancing the environment and saving energy costs. By lowering the differential pressure by means of this newly developed manifold, less damage will occur in the interior of a pulse-jet filter bag, a condition which may prolong the life-span of the filter bag, and which may prevent the development of holes in the filter medium which would render the bag useless.

The manifold of the invention is preferred to be attached to an inner cage of the filter element, not to the cell plate of the filter housing as with prior art devices. This attachment is achieved by, in one embodiment, a washer, or similar device, having a hole in the center that is attached such as by welding, to the parallel, longitudinal wires in the propeller-shaped inner cage.

Conventional pulse-jet inner cages are constructed with single, longitudinal wires that will not accommodate such attachment.

One method of mounting the manifold on the riveted inner cage is by means of pins and rivets that permit the individual parts of the inner cage to be provided to the user as an assembly-kit, and assembled, such as by riveting, at the point of use of the filter, thus saving transportation volume and costs. Welded inner cages of the prior art do not allow this benefit.

The filter bag may be mounted over its inner cage before it is installed into the cell plate hole of the filter housing. Installation, and later removal of the filter bag, is thereby facilitated, so that the time required for mounting or removing the filter element can be reduced by as much as half in some instances.

Thus the many aforementioned objects and advantages are most effectively attained. Although preferred embodiments of the invention have been disclosed, and described in detail herein, it should be understood that this invention is in no sense limited thereby and its scope is to be determined by that of the appended claims.

LIST OF ELEMENTS NUMBERED IN THE DRAWINGS

10 Frusto-conical propeller-shaped filter bag
11 Filter cloth or filter fabric
12 Circular band
13 Band attachment (seam, staple and others)
14 Ray or propeller blade
15 Moulded propeller-shaped bottom or boot
16 Ring cuff
17 Snap-band cuff
18 Top without pleats
19 Box-pleats
20 Frusto-conical propeller-shaped cartridge filter bag
21 Horizontal seam
22 Inner over lap seam
30 Frusto-conical propeller-shaped support cage
31 Frusto-conical longitudinal wire pair
32 Support element
33 Ring
34 Ray with eye
35 Blind rivet
36 Washer
37 Propeller-shaped metal end piece with holes for blind rivets
38 Top flange
40 Propeller form
41 Open space
42 Mean diameter
43 Drop-off side
44 Top bag diameter, cell plate fit
Filter Bag of FIGS. 15 and 16:
101 Snap-band
102 Cylindrical body of a filter bag
103 Design of a top-portion of a propeller-shaped pulse-jet filter bag
104 Top portion of a propeller-shaped pulse-jet filter bag
105 Frusto-conical design of a bottom-portion of a propeller-shaped pulse-jet filter bag
106 Frusto-conical bottom portion of a propeller-shaped pulse-jet filter bag
107 Bottom-piece of a conventional filter bag
108 Bottom-piece of a propeller-shaped filter bag with frusto-conical bottom
109 Longitudinal seam
110 Horizontal seam
111 Horizontal band
112 Filter medium 113 Dust particles
114 Longitudinal wires of inner support-cage
115 Air direction during filtration process
116 Compressed-air direction during cleaning cycle
117 Top-diameter of a filter bag
118 Form that the filter medium takes on in the middle of the cylindrical top-part
119 Form that the filter medium takes on in the cylindrical portion of the propeller-shaped filter bag at the position of a horizontal-band
120 Form that the filter medium takes on in the cylindrical portion of the propeller-shaped filter bag at the position between two horizontal-bands
121 Form that the filter medium takes on in the middle of the frusto-conical bottom-portion of a propeller-shaped filter bag
122 Bottom-diameter of the filter bag
123 Ballooning-out capacity of the cylindrical top-part of a propeller-shaped filter bag during the cleaning cycle
124 Ballooning-out capacity of the frusto-conical bottom-portion of a propeller-shaped filter bag during the cleaning cycle
Inner Cage
130 Parallel wire
131 Frusto-conical wire pair
132 Eight-lobed, inner cage ray-support
133 Perforated bottom-plate
134 Washer welded onto parallel wires
135 Blind-rivet to connect parallel wires to inner cage support
136 Pin to connect inner cage to manifold with two air-inlets
Manifold with Two Air-inlets
140 Manifold with two air-inlets combining flange 142 and venturi 141
141 Venturi
142 Flange with mounting links
143 Distance-tube
144 Mounting-link
145 Rivet used in the manifold
146 Compressed-air inlet
147 Secondary air inlet from the clean-gas room to enter the inner cage by means of a gap between the outer rim of the venturi and the top part of the flange
148 Barrel of venturi
149 Rim of metal flange-cuff
150 Nozzle-end of the venturi
151 Wire welded onto barrel of the venturi
152 Metal platform-ring for the barrel of the venturi to sit on
153 Flange

What is claimed is:

1. A pulse jet filter element, comprising:
an inner cage; and
a filter bag surrounding the inner cage, the filter bag comprising a generally cylindrical middle portion and a lower portion extending from and below the generally cylindrical middle portion, the lower portion having a frusto-conical shape that tapers from near a top of the lower portion of the filter bag to the bottom and terminal end of the filter bag, wherein the middle portion is positioned over the inner cage, and the lower portion of the filter bag that is above the bottom and terminal end of the filter bag is constructed and arranged to billow out and away from the inner cage when air is forced from inside the filter bag to an exterior of the filter bag.

2. A pulse jet filter element as described in claim 1, wherein the filter bag comprises a top portion extending from and above the generally cylindrical middle portion, wherein the top portion is constructed and arranged to billow out and away from the inner cage when air is forced from inside the filter bag to an exterior of the filter bag.

3. A pulse jet filter element as described in claim 1, further comprising a plurality of fastening devices that hold the middle portion of the filter bag against the inner cage, and wherein the top portion of the filter bag is not held against the inner cage.

4. A pulse jet filter element as described in claim 1, further comprising a plurality of annular bands that hold the middle portion of the filter bag against the inner cage, and wherein the lower portion of the filter bag that is above the bottom and terminal end of the filter bag is not held against the inner cage.

5. A pulse jet filter element as described in claim 1, wherein the filter bag comprises a plurality of spaced apart rays that extend radially from a center of the filter bag, wherein each of the plurality of spaced apart rays comprises a terminal end that is distal to the center of the filter bag, and wherein each of the plurality of spaced apart rays communicates with the interior of the center portion of the filter bag to provide airflow from the plurality of spaced apart rays to the center of the filter bag.

6. A pulse jet filter element as described in claim 1, wherein the filter bag further comprises a plurality of spaced apart rays that extend radially from a center of the filter bag, wherein each of the plurality of spaced apart rays comprises a terminal end that is distal to the center of the filter bag, and wherein each of the plurality of spaced apart rays communicates with the interior of the center portion of the filter bag to provide airflow from the plurality of spaced apart rays to the center of the filter bag, wherein the plurality of spaced apart rays is present on the middle portion of the filter bag, and the middle portion of the filter bag is positioned over the inner cage to hold the middle portion of the filter bag against the inner cage to substantially maintain the shape of the plurality of spaced apart rays when air is forced from inside the filter bag to an exterior of the filter bag, and the plurality of spaced apart rays are present on the lower portion of the filter bag that is above the bottom and terminal end of the filter bag, and the lower portion of the filter bag is constructed and arranged to billow out and away from the inner cage and substantially deform the plurality of spaced apart rays formed on the lower portion of the filter bag when air is forced from inside the filter bag to an exterior of the filter bag.

7. A pulse jet filter element as described in claim 1, wherein the filter bag comprises a plurality of spaced apart rays that extend radially from a center of the filter bag, wherein each of the plurality of spaced apart rays comprises a terminal end that is distal to the center of the filter bag, and wherein each of the plurality of spaced apart rays communicates with the interior of the center portion of the filter bag to provide airflow from the plurality of spaced apart rays to the center of the filter bag, and wherein the terminal end of the rays is enlarged from and wider than a portion of each of the rays that is adjacent to the center portion of the filter bag.

8. A pulse jet filter element as described in claim 1, wherein the lower portion of the inner cage is formed in a frusto-conical shape that tapers to a smaller bottom and terminal end of the inner cage, and wherein the filter bag is mounted over the inner cage, and the filter bag is held longitudinally by the inner cage.

9. A pulse jet filter element as described in claim 1, wherein the inner cage comprises radial members that extend from a center of the inner cage, and wherein the inner cage comprises enlarged ends that are present within the enlarged terminal ends of the rays of the filter bag.

10. A pulse jet filter element as described in claim 1, wherein the filter bag comprises a plurality of spaced apart rays that extend radially from a center of the filter bag, wherein each of the plurality of spaced apart rays comprises a terminal end that is distal to the center filter bag, wherein each of the plurality of spaced apart rays communicates with the interior of the center portion of the filter bag to provide airflow from the plurality of spaced apart rays to the center of the filter bag, and wherein the plurality of spaced apart rays is present on not less than 75% of the length of the filter bag.

11. A pulse jet filter element as described in claim 1, wherein the filter bag comprises a plurality of spaced apart rays that extend radially from a center of the filter bag, wherein each of the plurality of spaced apart rays comprises a terminal end that is distal to the center of the filter bag, and wherein adjoining rays of each of the plurality of spaced apart rays form a channel between the adjoining rays that is unobstructed at a lower end of the middle portion of the filter bag that adjoins the frusto-conical lower portion of the filter bag.

12. A pulse jet filter element as described in claim 1, the inner cage further comprising a manifold that mounts to a top of the filter cage and communicates with a top opening in the filter bag, wherein the manifold comprises a first opening and a second opening, the first opening forming a venturi that communicates with the top opening in the filter bag and the second opening is separated from and surrounds the first opening.

13. A pulse jet filter element as described in claim 1, the inner cage further comprising a manifold that mounts to a top of the filter cage and communicates with a top opening in the filter bag, wherein the manifold comprises a first opening and a second opening, the first opening forming a venturi that communicates with the top opening of the filter bag and the second opening is separated from and surrounds the first opening, the venturi comprising an upper opening and a lower opening that communicates with the top opening in the filter bag, wherein the portion of a shaft of the venturi that is below the flange of the manifold is shorter than a portion of the shaft of the venturi that is above the flange.

14. A pulse jet filter element as described in claim 1, the inner cage further comprising a manifold that mounts to a top of the filter cage and communicates with a top opening in the filter bag, wherein the manifold comprises a first opening and a second opening, the first opening forming a venturi that communicates with the top opening of the filter bag and the second opening is separated from and surrounds the venturi, the venturi comprising an upper opening and a lower opening that communicates with the top opening in the filter bag, wherein the lower opening of the venturi terminates on a flange of the manifold, and wherein the upper opening of the venturi is positioned above the second opening in the manifold and the lower opening of the venturi is positioned below the second opening in the manifold.

* * * * *